(12) United States Patent
Kim et al.

(10) Patent No.: US 9,401,521 B2
(45) Date of Patent: Jul. 26, 2016

(54) METHOD AND APPARATUS FOR DIAGNOSING STATE OF FUEL CELL SYSTEM

(71) Applicant: Hyundai Motor Company, Seoul (KR)

(72) Inventors: Hyo Seop Kim, Gyeonggi-do (KR); Il Hee Cho, Gyeonggi-do (KR); Jong Hyun Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/320,899

(22) Filed: Jul. 1, 2014

(65) Prior Publication Data

US 2015/0244010 A1 Aug. 27, 2015

(30) Foreign Application Priority Data

Feb. 24, 2014 (KR) .................. 10-2014-0021229

(51) Int. Cl.
*H01M 8/04* (2016.01)
*B60W 10/28* (2006.01)

(52) U.S. Cl.
CPC .......... *H01M 8/04574* (2013.01); *B60W 10/28* (2013.01); *H01M 8/04492* (2013.01);
(Continued)

(58) Field of Classification Search
CPC ................. Y02E 60/50; Y02E 50/523; H01M 2008/1095; H01M 8/04223; H01M 8/0488; H01M 8/04; H01M 16/006; H01M 2250/20; H01M 8/04365; H01M 8/04552; H01M 8/04559; H01M 8/04626; H01M 8/04649; H01M 8/04753; H01M 8/04947; H01M 8/04955; H01M 8/04231; H01M 8/04291; H01M 8/04388; H01M 8/04567; H01M 8/04582; H01M 8/04597; H01M 8/04664; H01M 8/04679; H01M 8/04761; H01M 8/04888; H01M 8/0491; H01M 8/1011; Y02T 90/32; Y02T 90/34; B60L 11/1887; G01R 31/3651; G01R 31/3662
USPC ......... 429/13, 22, 23, 30, 428, 429, 443, 513; 422/211; 320/132; 324/430; 307/10.1, 307/87; 702/185; 205/790.5
See application file for complete search history.

(56) References Cited

U.S. PATENT DOCUMENTS

2001/0046462 A1* 11/2001 Woods .................. B01J 8/0278
422/211
2004/0117676 A1* 6/2004 Kobayashi .......... H02M 7/4807
713/300

(Continued)

FOREIGN PATENT DOCUMENTS

JP H08-096825 A 4/1996
JP 2005-209577 A 8/2005

(Continued)

*Primary Examiner* — James Trammell
*Assistant Examiner* — Sanjeev Malhotra
(74) *Attorney, Agent, or Firm* — Mintz Levin Cohn Ferris Glovsky and Popeo, P.C.; Peter F. Corless

(57) ABSTRACT

Disclosed is a technique of diagnosing a state of a fuel cell system. The technique includes configuring a processor to calculate a duty ratio and an average output current, based on real-time driving data for a preset driving period, during operation of a fuel cell vehicle; obtain a reference current value from the calculated duty ratio and the calculated average output current; and determine a state of a fuel cell system by choosing a state graph corresponding to the obtained reference current value among a plurality of state graphs which vary depending on each reference current value.

15 Claims, 2 Drawing Sheets

(52) U.S. Cl.
CPC ...... *H01M 8/04664* (2013.01); *H01M 8/04992* (2013.01); *H01M 2250/20* (2013.01); *Y02E 60/50* (2013.01); *Y02T 90/32* (2013.01)

(56) References Cited

U.S. PATENT DOCUMENTS

| | | | | |
|---|---|---|---|---|
| 2006/0012340 | A1* | 1/2006 | Saeki | B60L 11/1887 320/132 |
| 2006/0055246 | A1* | 3/2006 | Jansen | B60L 3/0023 307/87 |
| 2006/0183006 | A1* | 8/2006 | Liu | H01M 8/008 429/432 |
| 2006/0222916 | A1* | 10/2006 | Norimatsu | H01M 8/04007 429/431 |
| 2008/0026272 | A1* | 1/2008 | Hong | H01M 8/04194 429/415 |
| 2008/0152973 | A1* | 6/2008 | Mogi | H01M 8/04291 429/413 |
| 2009/0117427 | A1* | 5/2009 | Manabe | H01M 8/04649 429/430 |
| 2009/0305100 | A1* | 12/2009 | Faye | H01M 8/04097 429/411 |
| 2010/0104912 | A1* | 4/2010 | Ogawa | H01M 8/0204 429/435 |
| 2010/0112401 | A1* | 5/2010 | Noto | H01M 8/04223 702/63 |
| 2010/0141262 | A1* | 6/2010 | Watanabe | H01M 8/04358 324/430 |
| 2010/0159360 | A1* | 6/2010 | Stute | H01M 8/04111 429/513 |
| 2010/0167145 | A1* | 7/2010 | Kume | H01M 8/04104 429/429 |
| 2010/0248060 | A1* | 9/2010 | Bono | H01M 8/04261 429/443 |
| 2012/0088170 | A1* | 4/2012 | Heo | H01M 8/04955 429/428 |
| 2012/0116722 | A1* | 5/2012 | Yousfi-Steiner | G06K 9/00496 702/185 |
| 2012/0145564 | A1* | 6/2012 | Yamazaki | H01M 8/04641 205/790.5 |
| 2012/0292990 | A1* | 11/2012 | Watanabe | H01M 8/0491 307/10.1 |

FOREIGN PATENT DOCUMENTS

| | | |
|---|---|---|
| JP | 2007-123007 A | 5/2007 |
| JP | 2007-172971 A | 7/2007 |
| JP | 2009037762 A | 2/2009 |
| JP | 2012089449 A | 5/2012 |
| KR | 10-0966226 | 8/2008 |
| KR | 10-2011-0032077 A | 3/2011 |

* cited by examiner

METHOD AND APPARATUS FOR DIAGNOSING STATE OF FUEL CELL SYSTEM

CROSS-REFERENCE(S) TO RELATED APPLICATION

The present application claims priority of Korean Patent Application Number 10-2014-0021229 filed on Feb. 24, 2014, the entire contents of which application are incorporated herein for all purposes by this reference.

BACKGROUND OF THE INVENTION

1. Field of the Invention

The present invention relates to a method and apparatus for diagnosing a state of a fuel cell system, and more particularly to a method and apparatus for diagnosing in real time a state of a fuel cell system from a driving profile.

2. Description of the Related Art

A fuel cell vehicle typically includes a fuel cell stack in which includes a plurality of fuel cells, a fuel supply system which supplies hydrogen as a fuel to the fuel cell stack, an air supply system which supplies oxygen serving as an oxidant which is necessary for electrochemical reaction, and a water-and-heat management system which controls the temperature of the fuel cell stack.

The fuel cell system supplies compressed hydrogen in a hydrogen tank to a fuel electrode (anode) of the fuel cell stack by reducing the pressure of the hydrogen, and the air supply system supplies external air, which is blown in by operating an air blower, over an air electrode (cathode) of the fuel cell stack.

When hydrogen is supplied to the fuel electrode of the fuel cell stack and oxygen is supplied to the air electrode, hydrogen ions are produced through catalytic reaction. The hydrogen ions are transmitted, through an electrolyte membrane, to an oxidation electrode or air electrode. The hydrogen ions, electrons, and oxygen undergo electrochemical reaction at the oxidation electrode, thereby producing electric energy. More specifically, electrochemical oxidation of hydrogen occurs at the fuel electrode and electrochemical reduction of oxygen occurs at the air electrode. In this case, electricity and heat are produced due to movement of electrons, and vapor or water is produced through the electrochemical reaction of combining oxygen and hydrogen.

Additionally, in most systems, a discharging apparatus is provided to discharge byproducts such as vapor, water and heat which are produced when the fuel cell stack produces electrical energy, and unreacted gases such as remaining hydrogen and oxygen. Via the discharging apparatus, gases such as vapor, hydrogen, and oxygen are discharged into the atmosphere through an exhaust passage.

In theory, there are mainly two conditions that could contribute to dryout of a fuel cell stack. One condition is when the fuel cell vehicle is operating at a high temperature and high output, and the other is during low output. Dryout at high temperatures and high outputs is attributed to a collapse of heat balance in a fuel cell stack. Whereas, dryout at a low output is attributed to failure in supply of enough air, poor temperature control, and reduction in water production due to application of a low current and not running a load.

A dryout of a fuel cell stack results in reduction in the output of a fuel cell stack. Furthermore, it takes a long time to recover back to a normal output. Still furthermore, if the dryout continues for a long period of time, the performance of the fuel cell stack may be reduced to the extent that it is impossible to be recovered so that the fuel cell stack is likely to break down. Accordingly, a technique is needed to detect the dryout of a fuel cell stack and to perform an operation for recovering the fuel cell stack when the dryout is detected so that the fuel cell stack can recover easily from the dryout.

Although there are conventional methods of detecting the dryout of a fuel cell stack, such as Current Interrupt (CI) and Electrochemical Impedance Spectroscopy (EIS), these methods uses a specific current band, and thus are difficult to use in real time while the vehicle is operating. In addition, these methods are difficult to apply to a vehicle because additional high output hardware is necessary which would pass an additional cost onto the consumer.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a method and apparatus for diagnosing a state of a fuel cell stack in real time, which enables an optimum operation condition of the fuel cell stack to be identified.

According to one aspect, a method of diagnosing a state of a fuel cell system includes: calculating, by a processor, a duty ratio and an average output current, based on driving data of a fuel cell vehicle for a preset driving period; obtaining, by the processor, a reference current value, based on the duty ratio and the average output current which are calculated; and determining, by the processor, a state of a fuel cell system by choosing a state graph corresponding to the obtained reference current value among state graphs which differ for each reference current value.

More specifically, the duty ratio may be obtained by calculating a ratio of a current output time during which a current is output from the fuel cell stack with respect to the preset driving period. Additionally, the average output current may be calculated by dividing a total current output from the fuel cell stack for the preset driving period by the driving time.

In some embodiments of the present invention, calculating of the reference current value may refer to obtaining a current value from the calculated average current, when the calculated duty ratio is 1.

Furthermore, state graph may a graph in which the duty ratio, the average output current, a maximum output current of the fuel cell stack, and a relative humidity at an inlet or outlet of the fuel cell stack are mapped. In the state graph, the duty ratio may correspond to a water production ratio of the fuel cell stack, and the average output current may correspond to a water production speed. In doing so, determining of the state of the fuel cell system may include determining a quantity of water produced by the fuel cell stack at the calculated duty ratio and the average output current.

The determining of the state of the fuel cell system may determine the state of the fuel cell system, based on the maximum output current of the fuel cell stack and the relative humidity at the inlet or outlet of the fuel cell stack which are mapped with the calculated average output current and the calculated duty ratio in the state graph.

The determining of the state of the fuel cell system may also include a step of dividing the state of the fuel cell system into a plurality of state sections according to the duty ratios and the average output currents, using a plurality of critical values as reference values which differentiate the state sections from one another and a step of determining to which state section the state of the fuel cell system belongs.

Also in some embodiments of the present invention, determining of the state of the fuel cell system may include dividing the state of the fuel cell system into a plurality of state sections according to the duty ratio and the average output current, using a plurality of critical values as reference values which differentiate the state sections from one another; diagnosing the state of the fuel cell system as a first abnormal state when the maximum output current is equal to or lower than a preset reference maximum output current and when the duty ratio and the average output current are within a range of a first state section among the plurality of state sections, as a first abnormal state; diagnosing the state of the fuel cell system as a second abnormal state when the maximum output current is less than or equal to the preset reference maximum output current and when the duty ratio and the average output current are within a range of a third state section among the plurality of state sections; and diagnosing the state of the fuel cell system as a normal state when the maximum output current exceeds the preset reference maximum output current and when the duty ratio and the average output current are within a range of a second state section among the plurality of state sections.

As such, the state graphs may be different for each operation temperature of the fuel cell stack in other illustrative embodiments. Further, the first state section and the second state section may be differentiated by a first critical value, the second state section and the third state section may be differentiated by a second critical value, and the first critical value may be smaller than the second critical value.

Advantageously, it is possible to diagnose a state of a fuel cell system as a wet or dry state in real time and obtain optimum operation conditions for the fuel cell system, such as a relative humidity, a needed quantity of water, and/or a maximum output according to the diagnosed state. In addition, it is possible to better understand a State of Fuel Cell (SFC) of a fuel cell system from a state graph, predict a state of a fuel cell vehicle, and secure stable driving performance based on the predicted state of the fuel cell vehicle. Finally, it is also possible to monitor a state of a fuel cell system according to driving conditions in real time and prevent a fuel cell vehicle from driving in driving-prohibited conditions. Accordingly, durability of the fuel cell vehicle can be improved as a result of above system.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
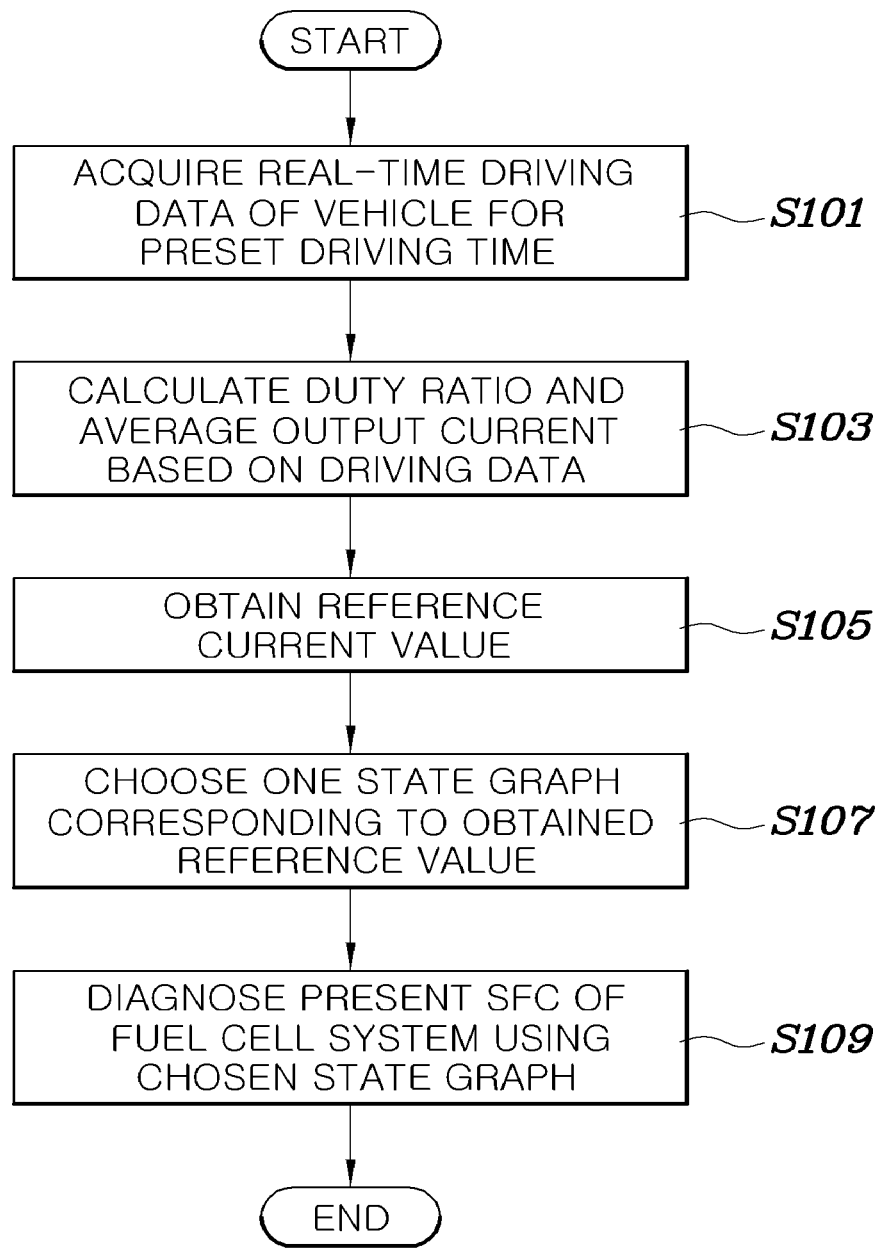
FIG. 1 is a flowchart showing a method of diagnosing a state of a fuel cell system according to one exemplary embodiment of the present invention.

Specific structural and functional descriptions of embodiments of the present invention disclosed herein are only for illustrative purposes of the embodiments of the present invention. The present invention may be embodied in many different forms without departing from the spirit and significant characteristics of the present invention. Therefore, the embodiments of the present invention are disclosed only for illustrative purposes and should not be construed as limiting the present invention.

Reference will now be made in detail to various embodiments of the present invention, specific examples of which are illustrated in the accompanying drawings and described below, since the embodiments of the present invention can be variously modified in many different forms. While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Each element and its shape may be schematically or exaggeratedly illustrated to help understanding of the invention. Some elements provided for a real product may not be illustrated or may be omitted in the drawings or description. The drawings should be construed only to aid understanding of the invention. Throughout the drawings, the same reference numerals will refer to the same or like parts.

FIG. 1 is a flowchart showing a method of diagnosing a state of a fuel cell system according to one embodiment of the present invention. The logic to implement this diagnosis may be executed by a Control Processing Unit (CPU) (i.e., processor), and a plurality of state graphs can be stored in a storage device (e.g., a memory or a drive). The following processes can be performed by an apparatus for diagnosing a state of a fuel cell system which includes a control device and a storage device.

With reference to FIG. 1, the method of diagnosing a state of a fuel cell system according to one exemplary embodiment of the present invention includes Step S101 in which real-time driving data for a preset driving time is obtained during the driving of a fuel cell vehicle, Step S103 in which a duty ratio and an average output current are calculated based on the obtained driving data, Step S105 in which a reference current value according to the calculated duty ratio and the calculated average output current is obtained, Step S107 in which a state graph corresponding to the obtained reference current value is chosen among a plurality of state graphs, and a step in which a current State of Fuel Cell (SFC) of the fuel cell system (i.e., at the present point in time) is diagnosed using the chosen state graph. The processes in the method of diagnosing a state of a fuel cell system may be repeatedly performed.

Factors that may impact the state of the fuel cell system include operation temperature, flow rate of air, average output current, minimum flow rate of air, duty ratio, etc. The duty ratio is understood herein to be a ratio of a time during which a current is output from a fuel cell stack with respect to a total driving time while a fuel cell vehicle is being operated. The average current corresponds to the speed of water production in the fuel cell stack during an operational time of the fuel cell vehicle. The flow rate of air is a quantity of air supplied to the fuel cell stack during while the fuel cell vehicle is being operated, and the minimum flow rate of air is a quantity of air supplied to the fuel cell stack in an idling period.

By driving the fuel cell vehicle for a preset period of time (hereinafter referred to as "driving time"), driving data of the fuel cell vehicle can be obtained. That is, the driving data can be obtained by monitoring an output current of the fuel cell stack according over this driving time or period. A duty ratio can then be calculated from the driving data. Specifically, the duty ratio can be obtained by calculating a ratio of a current output time, which is a period of time during which a current is output from the fuel cell stack, with respect to the preset driving time. An average output current can also be calculated from the driving data. The average output current can be calculated by dividing a total current output from the fuel cell stack for the preset driving time by the driving time.

Furthermore, in the exemplary embodiment of the present invention, a reference current value can be obtained from the calculated duty ratio and the calculated average output current. Specifically, the reference current value refers to a current value obtained when the duty ratio calculated from the average output current is 1. For example, when the calculated duty ratio is 0.6 and when the calculated average output current is 54 A, the reference current value is 90 A which is the same as the output current obtained when the duty ratio is 1.

In the exemplary embodiments of the present invention, state graphs may differ for each reference current value. That is, the average output current and the duty ratio may vary depending on the reference current value. As the average output current and the duty ratio vary, the maximum output current of the fuel cell stack, the relative humidity at an inlet or outlet of the fuel cell stack, and the quantity of water produced by the fuel cell stack accordingly vary. The state graph as such may be a graph in which the duty ratio, the average output current, the maximum output current, and the relative humidity are mapped with each other. The duty ratio, for example, may, correspond to a water production ratio of the fuel cell stack, and the average output current may correspond to the water production speed. The quantity of water produced by the fuel cell stack can then be obtained from the duty ratio and the average output current.

That is, it is possible to diagnose the state of a fuel cell system, based on each element, such as an average output current, a duty ratio, a maximum output current, and a relative humidity, mapped in the state graph which is chosen according to a reference current value. The state graph may also vary depending on an operational temperature of a fuel cell stack, i.e., a driving temperature of a fuel cell vehicle.

Accordingly, the method of diagnosing and the state graph will now be described in greater detail with reference to FIG. 2.

Figure 2:
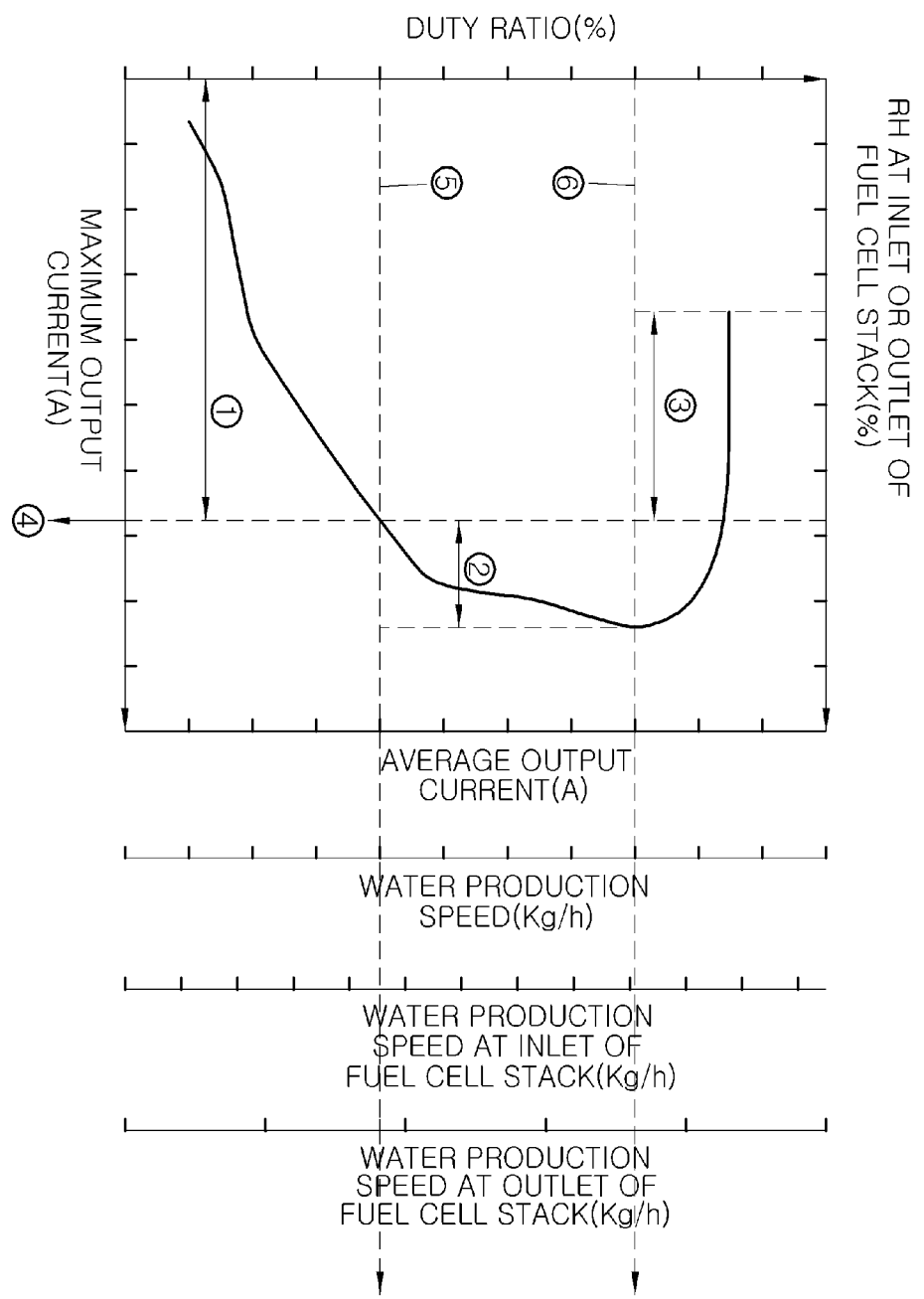
FIG. 2 is a diagram illustrating an example of a state graph according to one exemplary embodiment of the present invention.

FIG. 2 is a diagram illustrating an example of the state graph according to one embodiment of the present invention. With reference to FIG. 2, elements that can be identified from the state graph are a relative humidity at an inlet or outlet of a fuel cell stack, a duty ratio, an average output current, a maximum output current, a water production speed, etc.

From the state graph corresponding to a certain reference value, a relative humidity and a needed quantity of water corresponding to a duty ratio and an average output current of a fuel cell vehicle can be identified. That is, the state of the fuel cell system can be diagnosed, based on the maximum output current of the fuel cell stack and the relative humidity at the inlet or output of the fuel cell stack which are mapped with the calculated average output current and duty ratio.

For example, when the duty ratio is 0.2 and the average output current is 24 A among elements used to diagnose the state of the fuel cell system, the reference current value is 120 A. A state graph corresponding to a reference current value of 120 A is chosen. Then, a point corresponding to a duty ratio of 0.2 and an average output current of 24 A is located. The value of the relative humidity at the inlet or outlet of the fuel cell stack which is demanded for normal driving, and the quantity of water which needs to be produced by the fuel cell stack can be obtained, based on the water production speed corresponding to the relative humidity of the fuel cell stack and the average output current, and the water production ratio corresponding to the duty ratio which are indicated by the located point.

The value of the relative humidity at an inlet or outlet of a fuel cell stack and the quantity of water which needs to be produced by the fuel cell stack for normal driving can also be set in advance and stored as data in the storage device. By comparing the stored data, i.e. the relative humidity and the quantity of water for normal driving with an actual relative humidity and an actual quantity of water produced by the fuel cell stack at a present time, the state of the fuel cell system can be diagnosed. Furthermore, the state of the fuel cell system can also be diagnosed by comparing the output current needed for normal driving and the maximum output current.

For the purpose of diagnosing the state of the fuel cell system, the state of the fuel cell system may be divided into a plurality of state sections according to the duty ratio and the average output current. The state of the fuel cell system is then divided into a plurality of preset critical values serving as reference values which differentiate the state sections from one another. In the state graph, the state sections may be differentiated by the critical values of the duty ratio and the average output current which are determined according to actual driving conditions of a fuel cell vehicle.

For example, when a fuel cell system is under low humidity conditions (dryout state), the duty ratio and the average output current are relatively low. Accordingly, the quantity of water being produced by a fuel cell stack, the relative humidity at the inlet or outlet of the fuel cell stack, and the maximum output current measured in real time are all low. Accordingly, the point corresponding to the actual driving conditions is located in a left lower part in the state graph.

On the other hand, when the fuel cell system is under high humidity conditions (flooding state), the duty ratio, the average output current, and the quantity of water produced by the fuel cell stack are relatively high, but the output current demanded for driving of a fuel cell vehicle is relatively low.

Further, in normal conditions, as the duty ratio and the average output current increase, the maximum output current correspondingly increases.

More specifically, the state of the fuel cell system may be divided into a plurality of state sections (i.e. first to third state sections (1), (2), and (3)) by a plurality of critical values (i.e. first and second critical values (5) and (6)) of the duty ratio and the average output current. When the maximum output current during the driving of the fuel cell vehicle is equal to or lower than a preset reference maximum output current value (i.e., an output current value (4) indicating the state section (2) which is a normal state section), and when the duty ratio and the average output current are within a range of the first state section (1) among the first to third state sections (1), (2), and (3), the state of the fuel cell system may be diagnosed as a first abnormal state.

When the maximum output current is less than or equal to the preset reference maximum output current (4) and when the duty ratio and the average output current are within a range of the third state section (3) among the first to third state sections (1), (2), and (3), the state of the fuel cell system is diagnosed as a second abnormal state.

Alternatively, when the maximum output current exceeds the preset reference maximum output current (4) and when the duty ratio and the average output current are within a range of the second state section (2) among the first to third state sections (1), (2), and (3), the state of the fuel cell system is diagnosed as a normal state.

The first state section (1) and the second state section (2) are in the illustrative embodiment are differentiated by the first critical value (5), and the second state section (2) and the third state section (3) are differentiated by the second critical value (6). The first critical value (5) is smaller than the second critical value (6).

The first abnormal state may be referred to as a low SFC state, and the second abnormal state may be referred to as a high SFC state. The low SFC state means that a fuel cell vehicle is driving under low humidity conditions, i.e., in dry conditions. Accordingly, the output of the fuel cell stack may be (or should be) increased so that the quantity of water produced by the fuel cell stack can be increased, thereby alleviating the dryness. The high SFC state means that a fuel cell vehicle is driving under high humidity conditions. Accordingly, the output of the fuel cell stack may be (or should be) decreased so that the quantity of water produced by the fuel cell stack can be reduced, thereby suppressing the humidity.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method of diagnosing a state of a fuel cell system; comprising:
    calculating, by a processor, a duty ratio and an average output current, based on real-time driving data for a preset driving period during operation of a fuel cell vehicle;
    obtaining, by the processor, a reference current value from the calculated duty ratio and the calculated average output current, wherein the reference current value is a current value that is obtained when the duty ratio is 1, based on the calculated average output current;
    determining, by the processor, the state of the fuel cell system by choosing a state graph corresponding to the obtained reference current value among a plurality of state graphs which vary depending on each reference current value; and
    adjusting, by the processor, an output of a fuel cell stack according to the state of the fuel cell system,
    wherein the duty ratio is calculated by calculating a ratio of a current output time during which a current is output from the fuel cell stack with respect to the preset driving time.

2. The method according to claim 1, wherein the average output current is calculated by dividing a total current output from the fuel cell stack for the preset driving period by a driving time.

3. The method according to claim 1, wherein the state graph is a graph in which the duty ratio, the average output current, a maximum output current of the fuel cell stack, and a relative humidity at an inlet or output of the fuel cell stack are mapped together.

4. The method according to claim 1, wherein in the state graph, the duty ratio corresponds to a water production ratio of the fuel cell stack, and the average output current corresponds to a water production speed, and wherein determining the state of the fuel cell system includes identifying a quantity of water produced by the fuel cell stack at the calculated duty ratio and the calculated average output current.

5. The method according to claim 1, wherein determining the state of the fuel cell system includes diagnosing the state of the fuel cell system based on a maximum output current of a fuel cell stack and a relative humidity at an inlet or output of the fuel cell stack which are mapped with the calculated average output current and the calculated duty ratio in the state graph.

6. The method according to claim 5, wherein determining the state of the fuel cell system includes dividing the state of the fuel cell system into a plurality of state sections according to the duty ratio and the average output current, using a plurality of critical values as reference values to differentiate the state sections from each other, and determining to which state section among the plurality of state sections the state of the fuel cell system belongs.

7. The method according to claim 5, wherein the determining of the state of the fuel cell system comprises:
dividing the state of the fuel cell system into a plurality of state sections using a plurality of critical values of the duty ratio and the average output current;
diagnosing the state of the fuel cell system as a first abnormal state when the maximum output current is equal to or lower than a preset reference maximum output current and when the duty ratio and the average output current are within a range of a first state section among the plurality of state sections;
diagnosing the state of the fuel cell system as a second abnormal state when the maximum output current is equal to or lower than the preset reference maximum output current and when the duty ratio and the average output current are within a range of a third state section among the plurality of state sections; and
diagnosing the state of the fuel cell system as a normal state when the maximum output current exceeds the preset reference maximum output current, and when the duty ratio and the average output current are within a range of a second state section among the plurality of state sections.

8. The method according to claim 1, wherein the state graphs differ according to an operation temperature of the fuel cell stack.

9. The method according to claim 7, wherein the first state section and the second state section are differentiated by a first critical value, the second state section and the third state section are differentiated by a second critical value, and the first critical value is smaller than the second critical value.

10. A non-transitory computer readable medium containing program instructions executed by a processor, the computer readable medium comprising:
program instructions that calculate a duty ratio and an average output current, based on real-time driving data for a preset driving period during operation of a fuel cell vehicle;
program instructions that obtain a reference current value from the calculated duty ratio and the calculated average output current, wherein the reference current value is a current value that is obtained when the duty ratio is 1, based on the calculated average output current;
program instructions that determine a state of a fuel cell system by choosing a state graph corresponding to the obtained reference current value among a plurality of state graphs which vary depending on each reference current value; and
program instructions that adjust an output of a fuel cell stack according to the state of the fuel cell system,
wherein the duty ratio is calculated by calculating a ratio of a current output time during which a current is output from the fuel cell stack with respect to the preset driving time.

11. The non-transitory computer readable medium according to claim 10, wherein the program instructions that determine the state of the fuel cell system includes program instructions that diagnosis the state of the fuel cell system based on a maximum output current of the fuel cell stack and a relative humidity at an inlet or output of the fuel cell stack which are mapped with the calculated average output current and the calculated duty ratio in the state graph.

12. The non-transitory computer readable medium according to claim 11, wherein the program instructions that determine the state of the fuel cell system include program instructions that divide the state of the fuel cell system into a plurality of state sections according to the duty ratio and the average output current, using a plurality of critical values as reference values to differentiate the state sections from each other, and determine to which state section among the plurality of state sections the state of the fuel cell system belongs.

13. The non-transitory computer readable medium according to claim 11 wherein the program instructions that determine of the state of the fuel cell system comprises:
program instructions that divide the state of the fuel cell system into a plurality of state sections using a plurality of critical values of the duty ratio and the average output current;
program instructions that diagnosis the state of the fuel cell system as a first abnormal state when the maximum output current is equal to or lower than a preset reference maximum output current and when the duty ratio and the average output current are within a range of a first state section among the plurality of state sections;
program instructions that diagnosis the state of the fuel cell system as a second abnormal state when the maximum output current is equal to or lower than the preset reference maximum output current and when the duty ratio and the average output current are within a range of a third state section among the plurality of state sections; and
program instructions that diagnosis the state of the fuel cell system as a normal state when the maximum output current exceeds the preset reference maximum output current, and when the duty ratio and the average output current are within a range of a second state section among the plurality of state sections.

14. The non-transitory computer readable medium according to claim 10, wherein the state graphs differ according to an operation temperature of the fuel cell stack.

15. An apparatus comprising:
a processor configured to execute one or more processes; and
a memory configured to store a process of the one or more processes executable by the processor, the process when executed operable to:
calculate a duty ratio and an average output current, based on real-time driving data for a preset driving period during operation of a fuel cell vehicle;
obtain a reference current value from the calculated duty ratio and the calculated average output current, wherein the reference current value is a current value that is obtained when the duty ratio is 1, based on the calculated average output current;
determine a state of a fuel cell system by choosing a state graph corresponding to the obtained reference current value among a plurality of state graphs which vary depending on each reference current value; and
adjust an output of a fuel cell stack according to the state of the fuel cell system,
wherein the duty ratio is calculated by calculating a ratio of a current output time during which a current is output from the fuel cell stack with respect to the preset driving time.

* * * * *